United States Patent [19]

Iwazumi

[11] 3,927,377
[45] Dec. 16, 1975

[54] NONLINEAR FILTER FOR DETECTING ELECTROCARDIOGRAM R-WAVES AND OTHER PHYSIOLOGICAL SIGNALS

[76] Inventor: Tatsuo Iwazumi, 6548 39th Ave., NE., Seattle, Wash. 98115

[22] Filed: Mar. 1, 1974

[21] Appl. No.: 447,328

[30] Foreign Application Priority Data
Mar. 2, 1973  Japan................. 48-25885

[52] U.S. Cl............ 328/167; 128/2.06 B; 307/233; 307/295; 328/138; 328/140; 330/109
[51] Int. Cl.².. H03D 13/00; A61B 5/04; H03B 1/00
[58] Field of Search .......... 307/230, 231, 233, 295; 330/109; 328/138, 140, 167; 128/2.06 R, 2.06 B, 2.06 E

[56] References Cited
UNITED STATES PATENTS

| 3,353,035 | 11/1967 | Dent | 328/138 |
|---|---|---|---|
| 3,555,438 | 1/1971 | Ragsdales | 328/138 |
| 3,572,324 | 3/1971 | Petersen | 128/2.06 B |
| 3,696,252 | 10/1972 | Chapman | 307/233 |
| 3,709,034 | 1/1973 | Herzl | 307/233 |

*Primary Examiner*—Stanley D. Miller, Jr.
*Attorney, Agent, or Firm*—Wenderoth, Lind & Ponack

[57] ABSTRACT

A nonlinear filter system for detecting electrocardiogram R-waves and other physiological signals is disclosed. The system includes a high Q band-pass filter for detecting spectral energy indicative of the signal of interest, and producing an output responsive thereto; a one-shot trigger circuit connected to the band-pass filter; and a delay circuit connected to the trigger circuit for reducing the Q for a short period in response to output from the trigger circuit.

1 Claim, 4 Drawing Figures

NONLINEAR FILTER FOR DETECTING ELECTROCARDIOGRAM R-WAVES AND OTHER PHYSIOLOGICAL SIGNALS

BACKGROUND OF THE DISCLOSURE

1. Field of the Invention

The invention relates to electrocardiograms and specifically to a nonlinear filter system for detecting the R-wave from the electrocardiogram.

2. Description of the Prior Art

It is very important, for properly diagnosing the functions of the heart, to reliably detect electrocardiogram R-waves. For this purpose, various methods have been used. The most conventional method is the use, in combination with a low noise amplifier having high input impedance and a suitable linear band-pass filter, of electrodes which are applied to the skin using electrically conductive jelly to detect the electrocardiogram wave as accurately as possible. However, the electromyogram wave is unavoidably detected and mixed into the electrocardiogram even if the conductive jelly is used. Furthermore, the jelly dries several hours after its application and the contact resistance between electrodes and the skin increases, causing rather severe noise problems.

A complicated signal processing method is required in order to accurately detect the R-wave in such a noisy electrocardiogram over many hours. Examples of complex prior art methods include a matched filter (whereby an input wave form and a standard wave form are convolution-integrated by means of an electronic computer) and Fourier analysis. These, however, are linear signal processing methods.

It has been possible to detect the R-waves in a noisy electrocardiogram with better than 90% accuracy by using various computer algorithms designed for wave form recognition in conjunction with either of the above methods.

As is well known, a peak spectrum distribution exists somewhere between 15 and 20 HZ when the R-wave is analyzed under Fourier analysis. The R-wave cannot be detected in a noisy electrocardiogram with a high Q linear tuning or bandpass filter which ordinarily maximizes S/N ratio. The reason is simply that any high Q circuit has a long transient response, thus resulting in ringings between R-waves which makes it impossible to accurately detect the R-waves.

SUMMARY OF THE INVENTION

The present invention provides a nonlinear filter system having a much less complex circuit than the above-described conventional system and a far higher capability of rejecting a noise than linear band-pass filters such as are conventionally utilized. The system of the subject invention has proven nearly equal in performance to the matched filter method, and is capable of detecting R-waves for hours without using conductive jelly, thus avoiding the problem of increasing resistance.

DETAILED DESCRIPTION OF THE PREFERRED EMBODIMENT

A preferred embodiment of the present invention will now be explained in detail with reference to the accompanying drawings.

Reference number 1 denotes an active tuning circuit comprising a transistor Q1, a micropower programmable operational amplifier IC, a feedback adjustment circuit 2, and RC circuit 3.

Figure 1:
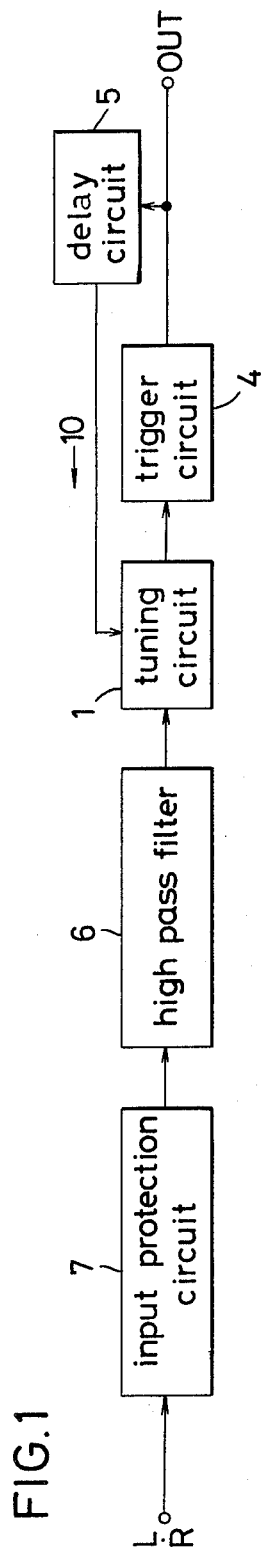
FIG. 1 is a block diagram showing a nonlinear filter system according to the present invention.
Figure 2:
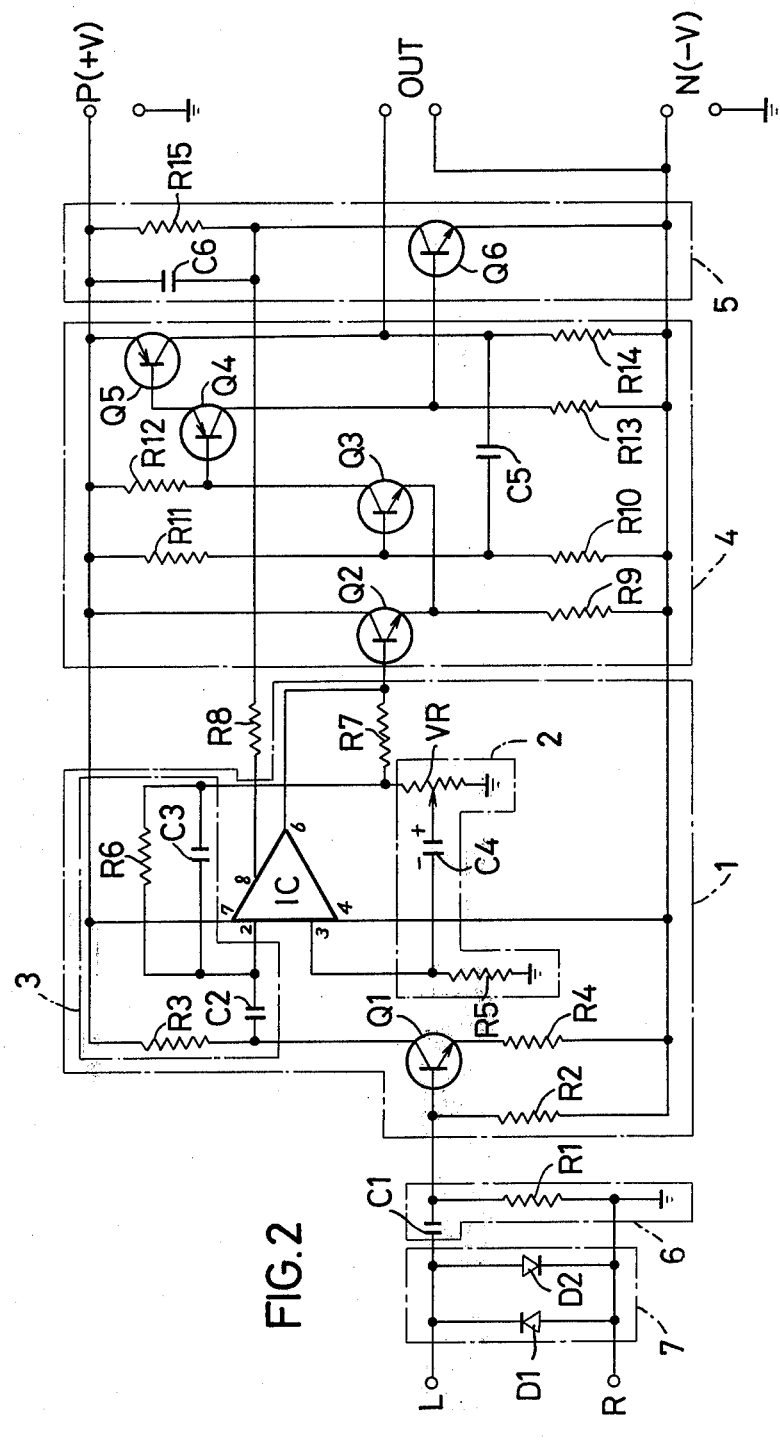
FIG. 2 is a circuit diagram showing a preferred embodiment of the present invention.

Programmable operational amplifier IC is meant to be a transistor operational amplifier of the known type including a plurality of stages the collector currents of which may be increased (or decreased) by increasing (or decreasing) an externally accessible bias current via terminal 8 of the amplifier IC shown in FIG. 2, thereby making it possible to control the gain, bandwidth and other characteristics of the amplifier.

Examples of commercially available programmable operational amplifiers include SE/NE 553, $\mu$A 776, MC 1776, UC 4250, LM 4250, CA 3080, CA 3060, CA 3078, HA 2720 and HA 2725.

The feedback adjustment circuit 2 is a phase lead network in a positive feedback path of the amplifier IC, and comprises a capacitor C4, a resistor R5 and a variable resistor VR for varying the amount of positive feedback, to adjust the quality factor (Q) of the tuning circuit 1.

An RC circuit 3 is provided in the negative feedback path of the amplifier IC, and comprises capacitors C2, C3 and resistors R3, R6, where R3 also serves as a collector resistor of transistor Q1 to save component count.

The numeral 4 indicates a trigger circuit provided at the output of the amplifier IC and generates a single-shot trigger pulse when the amplifier output exceeds a preset voltage level which is determined by a voltage divider comprising R10 and R12; the trigger circuit per se consisting of transistors Q2, Q3, Q4 and Q5, a capacitor C5, and resistors R9, R10, R11, R12, R13 and R14 as shown.

Reference numeral 5 denotes a delay circuit provided at the output of the trigger circuit 4 and adapted to vary a bias current of the programmable amplifier IC in order to deactivate the tuning circuit 1 for about 0.2 to 0.3 seconds after the operation of the trigger circuit 4, the delay circuit comprising a transistor Q6, and a capacitor C6 together with a resistor R15 having an appropriate time constant.

The numeral 6 designates a high-pass filter consisting of a capacitor C1 and resistors R1 and R2, and reference numeral 7 indicates an input protection circuit comprising oppositely arranged parallel diodes D1 and D2.

The reference letters R and L are input terminals, to which right and left dry electrocardiogram electrodes are respectively connected.

The reference OUT indicates output terminals which are connected to any suitable means to observe the R-wave occurrence in an electrocardiogram, such as an oscilloscope, for example.

The references P and N indicate power supply terminals.

The present system is constructed as hereinbefore described, and the operation thereof will now be explained.

Initially, a wave spectrum is detected by the high Q tuning circuit 1 through the preceding high-pass network 6 by connecting the right and left electrodes to the input terminals R and L respectively.

Referring to FIG. 2, as the tuning circuit 1 responds to an R-wave, the output of the tuning circuit 1 exceeds a predetermined level and actuates the trigger circuit 4 which then supplies an impulse output to the output terminals OUT. At the same time, by the momentary "ON" action of the transistor Q6, the collector of transistor Q6 is shorted to the negative supply voltage N, thus the bias current to the programmable operation amplifier IC in the tuning circuit 1 becomes zero.

Figure 3:
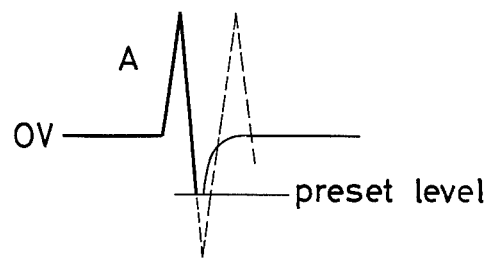
FIGS. 3 and 4 are diagrams showing wave forms developed at certain parts of the above circuit.
Figure 4:
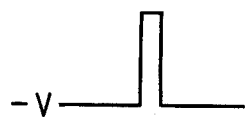

With the cessation of output from the tuning circuit 1, the trigger circuit 4 returns to its original state and transistor Q6 is turned "OFF". An appropriate width of the impulse, which is determined by C5, R10 and R11, is about 10 ms to allow sufficient time for transistor Q6 to charge C6 completely. Capacitor C6 discharges through R8 and R15 but the value of R8 is chosen much greater than that of R15. Hence, the discharge time constant is primarily determined by C6 and R15. As the voltage at the junction of C6, R8 and R15 rises, the bias current of the programmable operational amplifier IC is gradually restored. At some bias current, the value of which depends on the particular type of the programmable operational amplifier used, the amplifier IC becomes activated, and the amplifier gain increases rapidly with the bias current increase. As a result, the tuning circuit 1 is reactivated after a short period of deactivation (0.2 to 0.3 second) as determined by the time constant R15 and C6. The output wave form A of the tuning circuit 1 is shown in FIG. 3. Corresponding to the above operation, an impulse such as shown in FIG. 4, is obtained for each R-wave detected at the output terminals OUT.

According to the present invention as described above, since the trigger circuit 4 is operated by the action of the tuning circuit, and since the tuning circuit 1 is deactivated for a predetermined period through the delay circuit 5, the present system does not have a long transient response continuing between each R-wave as is the case if a linear high Q filter or band-pass filter is used. Thus the subject invention allows for the reliable detection of each occurrence of the R-wave.

Moreover, erroneous operation of the circuit due to an abnormal T-wave can be completely eliminated by adjusting the delay period of the tuning circuit 1, i.e., by adjusting the time constant determined by the capacitor C6 and the resistor R15.

In the embodiment as shown in FIG. 2, the reduction of Q is achieved by eliminating the bias current of the programmable operational amplifier IC by turning on the transistor Q6. The same effect may be obtained by controlling the gate voltage of a field effect transistor inserted in either the negative feedback path or positive feedback path of the amplifier IC.

In the same manner, when the tuning or band-pass filter section of the present invention is designed by using a plurality of operational amplifiers, there are any number of ways to control the Q of the filter. Therefore, it is understood that any means of controlling the Q of the filter is within the spirit of the present invention.

It is thought that the invention and its advantages will be understood from the foregoing description, and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A nonlinear filter system for detecting a signal of a particular waveform, such as an electrocardiogram R-wave, in the presence of loud noise, said filter system comprising:
   a high Q band-pass filter for detecting spectral energy of the signal of interest and producing an output indicative thereof;
   a one-shot trigger circuit connected to said band-pass filter and driven by the output thereof; and
   a delay circuit means connected to said trigger circuit and said band-pass filter for reducing the Q of said band-pass filter for a short prescribed period in response to an output from said trigger circuit.

* * * * *